United States Patent
Drønen

(10) Patent No.: US 11,215,050 B2
(45) Date of Patent: Jan. 4, 2022

(54) INFLOW INDICATOR APPARATUS

(71) Applicant: Scale Protection AS, Harstad (NO)

(72) Inventor: Ole Magnar Drønen, Harstad (NO)

(73) Assignee: Scale Protection AS, Harstad (NO)

( * ) Notice: Subject to any disclaimer, the term of this patent is extended or adjusted under 35 U.S.C. 154(b) by 691 days.

(21) Appl. No.: 16/078,200

(22) PCT Filed: Feb. 21, 2017

(86) PCT No.: PCT/NO2017/050046
§ 371 (c)(1),
(2) Date: Aug. 21, 2018

(87) PCT Pub. No.: WO2017/146588
PCT Pub. Date: Aug. 31, 2017

(65) Prior Publication Data
US 2021/0222545 A1 Jul. 22, 2021

(30) Foreign Application Priority Data
Feb. 24, 2016 (NO) .................................... 20160312

(51) Int. Cl.
*E21B 47/11* (2012.01)
*E21B 33/10* (2006.01)
(52) U.S. Cl.
CPC .............. *E21B 47/11* (2020.05); *E21B 33/10* (2013.01)
(58) Field of Classification Search
CPC ................................ E21B 47/11; E21B 33/10
See application file for complete search history.

(56) References Cited

U.S. PATENT DOCUMENTS

| 3,766,388 | A | 10/1973 | Greaney |
| 5,804,714 | A | 9/1998 | Rouhiainen |
| 2011/0239754 | A1 | 10/2011 | Dyer et al. |
| 2012/0168152 | A1 | 7/2012 | Casciaro |
| 2013/0245948 | A1 | 9/2013 | Nyhavn |
| 2014/0083675 | A1 | 3/2014 | Grigsby et al. |
| 2014/0299756 | A1 | 10/2014 | Cameron |

(Continued)

OTHER PUBLICATIONS

Norwegian Search Report, Norwegian Patent Application No. 20160312, date of completion Aug. 19, 2016.

(Continued)

*Primary Examiner* — Crystal J Miller
(74) *Attorney, Agent, or Firm* — Andrus Intellectual Property Law, LLP

(57) ABSTRACT

An inflow indicator apparatus is for a well in an underground structure in which at least one tracer depot is arranged to be in contact with a partial fluid flow flowing from a producing structure into the well. The inflow indicator apparatus has a tubular body, a seal encircling a portion of the tubular body, arrangement of the at least one tracer depot externally on the tubular body, the seal being settable against an encircling wall, and the tubular body, the seal and the encircling wall defining an annulus forming a first flow path for the partial fluid flow which is separated from a second fluid flow path through the inflow indicator apparatus for a main fluid flow formed of a through fluid line in the tubular body, the first flow path extending from the seal to an end portion of the tubular body.

15 Claims, 3 Drawing Sheets

(56) References Cited

U.S. PATENT DOCUMENTS

2015/0176396 A1\* 6/2015 Nyhavn .................. E21B 43/14
73/152.29
2015/0376994 A1 12/2015 Mebratu

OTHER PUBLICATIONS

International Search Report, PCT/NO2017/050046, dated Jun. 28, 2017.
Written Opinion, PCT/NO2017/050046, dated Jun. 28, 2017.

\* cited by examiner

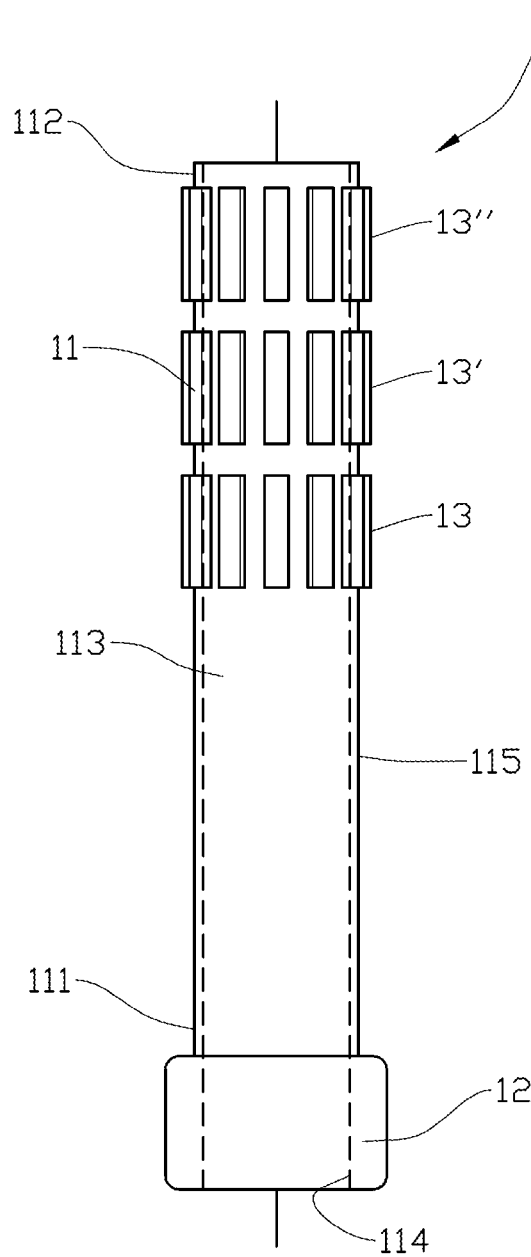
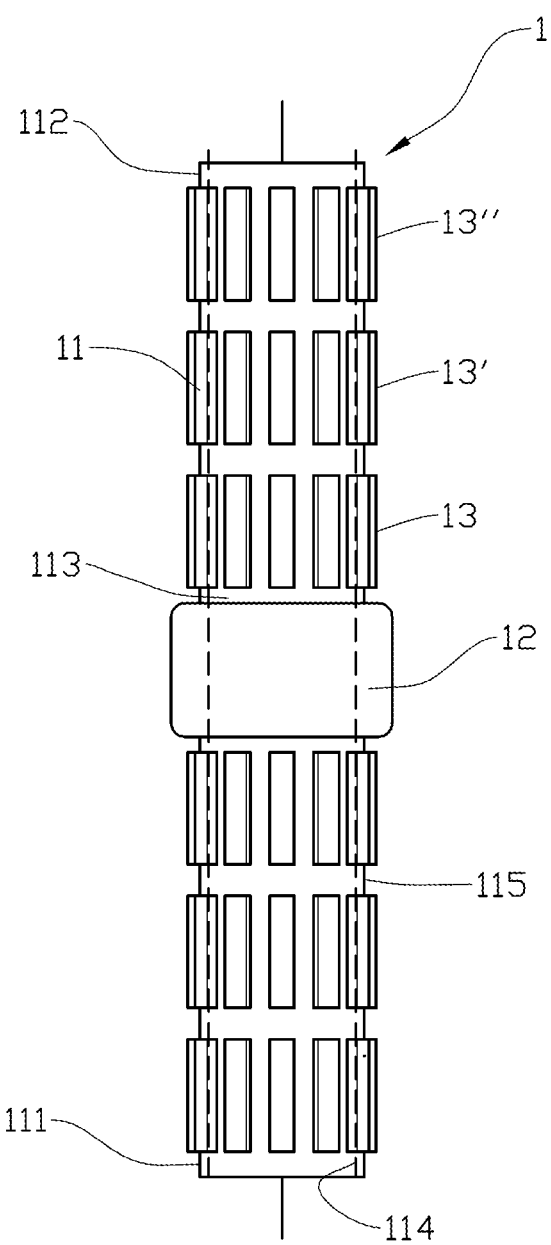
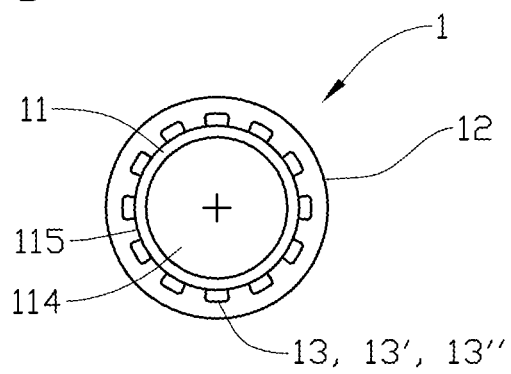

INFLOW INDICATOR APPARATUS

FIELD

The invention relates to an inflow indicator apparatus for a well in an underground structure, in which at least one tracer depot is arranged to be in contact with a partial fluid flow flowing from a producing structure into the well. A method of monitoring the inflow of a partial fluid flow from a producing structure into a well in an underground structure is described as well.

BACKGROUND

When monitoring the inflow into a production tubing from different production zones in an underground well, for example a hydrocarbon well, it is known to use tracers that are dissolved in the fluid flowing into the well and up through the production tubing. Tracers of different characteristics are often used in order to enable the formation of a picture of the inflow situation in different parts of the well. Typically, different types of tracers are used at different locations in the well to provide an overview of the inflow into different parts of the well, and tracers which can provide indications of what is flowing in to the different parts of the well, especially of whether a structure is only producing formation water, are used, by tracers reacting differently on contact with a fluid type being used, for example tracers that are dissolvable only in contact with water, but non-dissolvable in contact with hydrocarbons. Tracers can also be used to give an indication of whether decreasing inflow is due to beginning formation of deposits in the openings of the production tubing, or whether the decreasing inflow is due to the reservoir being in the process of being depleted.

The tracers are placed in apparatus that is lowered into the well before the measuring starts. The apparatus may constitute a permanent part of the well installation, for example in the form of a sand screen with integrated tracer depots in a production tubing, or the apparatus may have as its sole function to contain the tracers. The tracers are preferably formed as dissolvable salts that are typically contained in pores in a porous, non-dissolvable block material positioned in contact with the fluid flow passing through the apparatus. The tracers are thereby released gradually and over a long time.

It is a problem to provide a good overview of the inflow into a well from different production zones when the accumulated fluid flow is coming into contact with the tracers in all the portions of the well, that is to say all the production zones in the well.

US2011239754A1 discloses a system and a method for indicating inflow of water in a well producing hydrocarbons. Tracer depots that are dissolved by water, but not by hydrocarbons, are placed in the well by, for example, being arranged on downhole well components or casing at a production zone, being pumped into the well as part of a mixture which is used to prop a structure or as a gravel pack, for fracturing the structure, et cetera, or is forced into a structure surrounding the well in a perforation operation. The presence of a tracer in the production fluid from the well is registered by a sensor system with several sensors arranged at different locations in the well, the sensors being connected to a processing system at the surface via a communication line extending up through the borehole. Even though different production zones are isolated from each other by means of isolation devices, for example packers, the document teaches nothing about how production fluids from a production zone are prevented from coming into contact with tracers in a production zone lying above (downstream).

From US2015176396A1 a system and a method for estimating fluid flow rates for each one of several separate production zones in a multilayer reservoir to a well extending through the reservoir are known. Distinct tracer sources are placed in known positions in the inflow path of each inflow zone, which is defined from a so-called reservoir base line in the well by means of an entry point. The entry points may be provided by holes, openings in a completion, a pipe or a screen, or be provided as a valve. The tracers may have been placed in the reservoir during completion of the well or in well equipment, which has been installed in the well or reservoir later. The tracers may further be placed in the reservoir formation, in a completion, a casing, a liner or in equipment arranged in the well. The inflow zones represent completion zones, which are separated from each other by means of flow isolation (packers). It cannot be deduced how an inflow indicator apparatus may be constructed.

SUMMARY

The invention has for its object to remedy or reduce at least one of the drawbacks of the prior art or at least provide a useful alternative to the prior art.

The object is achieved through the features that are specified in the description below and in the claims that follow.

The invention relates to an apparatus arranged to be placed at a production zone in a well in order to, by means of the release of one or more tracers, be used in monitoring the inflow of fluid into the well from said production zone without the tracers being affected by a fluid flow from production zones upstream (downstream) of said production zone. The apparatus comprises a tubular body which is placed in a through flow path for production fluids, forming an annulus encircling the tubular body. The apparatus is provided with a settable seal, which is arranged to close to the flow of fluids in the annulus between first and second end portions of the apparatus. A wall encircling the tubular body is typically an internal wall of a portion of a casing, but is not limited to that kind of pipe. The wall may also consist of a borehole wall. The apparatus is provided with at least one tracer depot arranged on the periphery of the apparatus between said seal and one end portion or both end portions of the tubular body.

The tubular body of the apparatus may have a length, which is adapted to the extent of the inflow portion of the well for a production zone, the apparatus extending substantially along the entire inflow portion. The length of the tubular body may also be considerably smaller than the extent of the inflow portion in the axial length of the well. Fluid entering the well from said production zone is kept separated from the fluid flowing from other, upstream production zones of the well, until the partial fluid flow reaches the open end portion(s) of the annulus, where the partial fluid flow mixes with the fluids flowing from other, upstream production zones in the well, also termed the main fluid flow. By the very fact of said annulus being closed by means of the seal, fluid flowing out of the well from production zones upstream (downstream) of said production zone will not be able to flow through said annulus and come into contact with the at least one tracer depot in the apparatus. Correspondingly, fluid that is flowing out of other production zones will only come into contact with a tracer depot/tracer depots in a respective apparatus placed at each of these production zones.

The invention is defined by the independent claims. The dependent claims define advantageous embodiments of the invention.

In a first aspect, the invention relates more specifically to an inflow indicator apparatus for a well in an underground structure, in which at least one tracer depot is arranged to be in contact with a partial fluid flow flowing from a producing structure into the well, characterized by the inflow indicator apparatus comprising a tubular body and a seal encircling a portion of the tubular body, the at least one tracer depot being arranged externally on the tubular body, and the seal being settable against an encircling wall, and the tubular body, the seal and the encircling wall defining an annulus forming a first flow path for the partial fluid flow which is separated from a second flow path through the inflow indicator apparatus for a main fluid flow formed of a through fluid line in the tubular body, the first flow path extending from the seal to an end portion of the tubular body.

The seal may encircle a first end portion of the tubular body. Alternatively, the seal may encircle a middle portion of the tubular body.

The first end portion may be arranged upstream in the well. Alternatively, it may be arranged downstream in the well.

The tubular body may exhibit a length considerably smaller than an axial extent of an inflow portion for the producing structure in the well. Alternatively, the tubular body may exhibit a length substantially equal to the axial extent of the inflow portion for the producing structure in the well.

The encircling wall may be a pipe wall, typically a casing wall. Alternatively, the encircling wall may be a well wall defining a borehole against the underground structure.

In a second aspect, the invention relates more specifically to a method of monitoring the inflow of a partial fluid flow from a producing structure into a well in an underground structure, characterized by the method comprising the steps:
- arranging an apparatus according to the first aspect of the invention at the producing structure,
- forming a first flow path for the partial fluid flow in an annulus between the apparatus and the encircling wall from an inflow portion from the producing structure by defining the annulus by setting a seal against the encircling wall, in order thereby to prevent the flow of a main fluid flow in the annulus,
- letting the partial fluid flow be brought into contact with at least one tracer depot arranged externally on the tubular body,
- directing the partial fluid flow into the main fluid flow at an end portion of the tubular body,
- directing an accumulated fluid flow out of the well, and
- registering the contents of tracers released from the at least one tracer depot into the partial fluid flow.

BRIEF DESCRIPTION OF THE DRAWINGS

In what follows, examples of preferred embodiments are described, which are visualized in the accompanying drawings, in which:

FIG. 1 shows a side view of the apparatus according to a first embodiment of the invention;

FIG. 2 shows a side view of the apparatus according to a second embodiment of the invention;

FIG. 3 shows an end view of the apparatus;

DETAILED DESCRIPTION OF THE DRAWINGS

Figure 4:
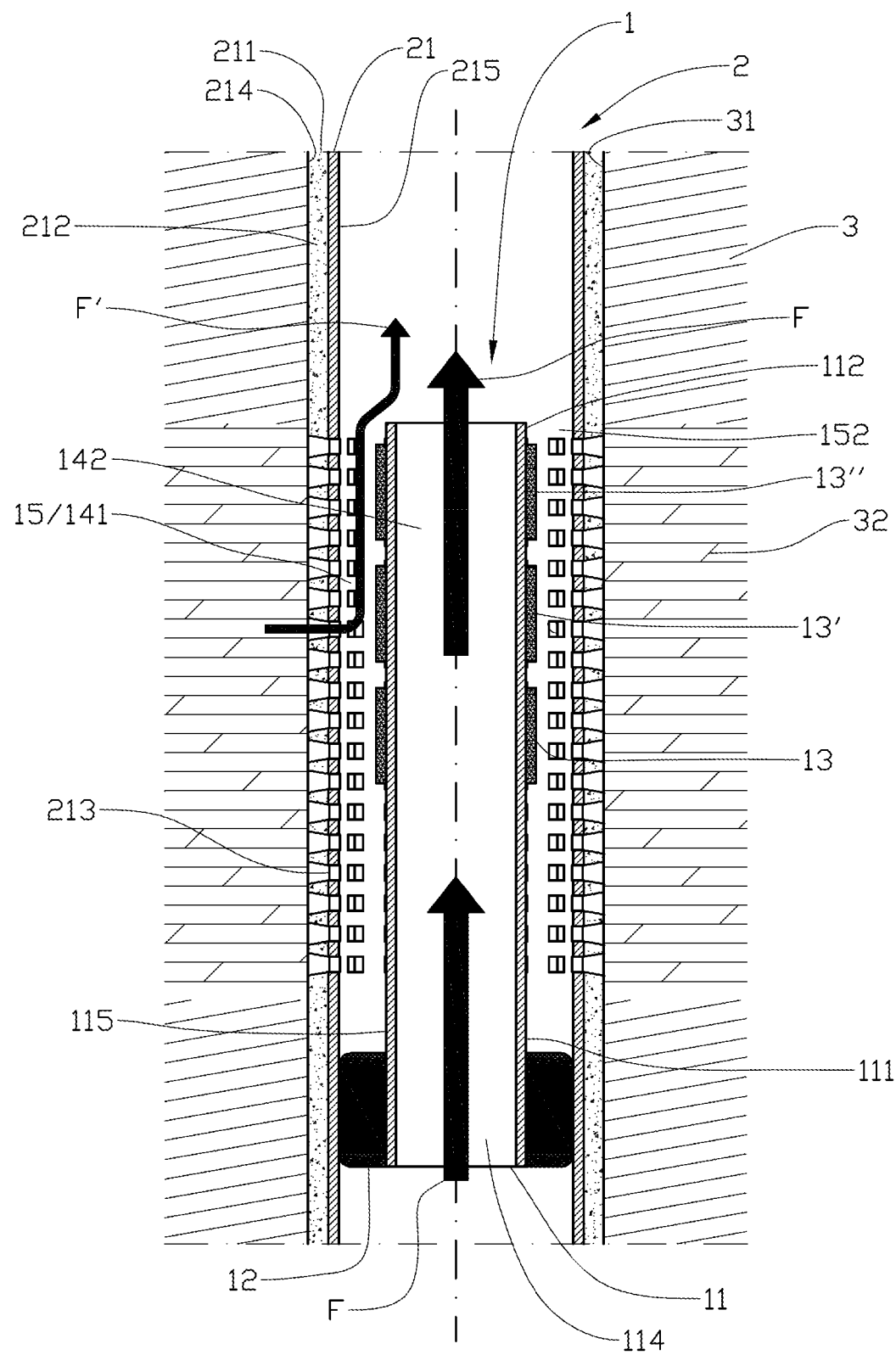
FIG. 4 shows an axial section of section of a well in which an apparatus according to the first embodiment of the invention is placed in a casing at a production zone.

Reference is first made to FIGS. 1 and 3 in which the reference numeral 1 indicates an inflow indicator apparatus, also called the apparatus in what follows. The apparatus 1 is formed of a tubular body 11 forming a through fluid line 114 in the apparatus 1. A settable seal 12 encloses a portion of the tubular body 11, shown here to be arranged on a first end portion 111 of the tubular body 11. On an external pipe wall 115 several tracer depos 13, 13', 13" are disposed. In a manner known per se, the tracer depots 13, 13', 13" contain one or more tracers which are typically contained in salt arranged in a porous material. The tracer depots 13, 13', 13" may differ, in a manner known per se, by the salts containing the tracers possibly reacting dissimilarly in contact with the different fluids that may enter the well 2.

FIG. 2 shows an alternative embodiment in which the settable seal 12 encircles a middle portion 113 of the tubular body 11, and in which there are tracer depots 13, 13', 13" arranged on both sides of the seal 12.

Reference is now made, in the main, to FIG. 4. A well 2, which is established in an underground structure 3 by a borehole 31 extending through a hydrocarbon reservoir 32, also called the producing structure, is provided with a casing 21 in a manner known per se. The casing 21 and the wall 214 of the borehole 31 define a borehole annulus 211, which is filled with cement 212 in a manner known per se. The casing 21 and the cement 212 are perforated, in a manner known per se, at the producing structure 32 to form an inflow portion 213 providing fluid flow paths between the producing structure 32 and the well 2. The apparatus 1 is lowered down the well 2 through the casing 21 to the producing structure 32, where an inflow portion 213 has been formed in a production tubing 21. The seal 12 is set against the internal wall 215 of the casing 21 above the inflow portion 213, the tubular body 11 of the embodiment shown extending through the entire inflow portion 213 and forming a flow annulus 15, which is defined at one end by the seal 12. Said flow annulus 15 thereby forms a first flow path 141 for a partial fluid flow F' from the producing structure 32, the first flow path 141 extending from the seal 12 to a mouth 152 at an end portion 112 of the tubular body 11, where said partial fluid flow F' meets a main fluid flow F from other producing structures (not shown) lying below in the well 2. The center bore 114 of the tubular body 11 forms a through, second flow path 142 through the apparatus 1 separated from the first flow path 141. By the very fact of the partial fluid flow F' being separated from the main fluid flow F in the well 2, the tracer depots 13, 13', 13" will not come into contact with the main fluid flow F. Thereby, finding tracers of the specific type or types that are placed in the apparatus 1 gives a clear picture of the production from this structure 32. Correspondingly, placing apparatuses 1 with other types of tracers at other producing structures (not shown) in the well 2 will give information on the production from these structures not shown.

The apparatus may also be fitted the other way round to what is shown in FIG. 4, that is to say, the first flow path 141 ending upstream in the well 2.

Figure 5:
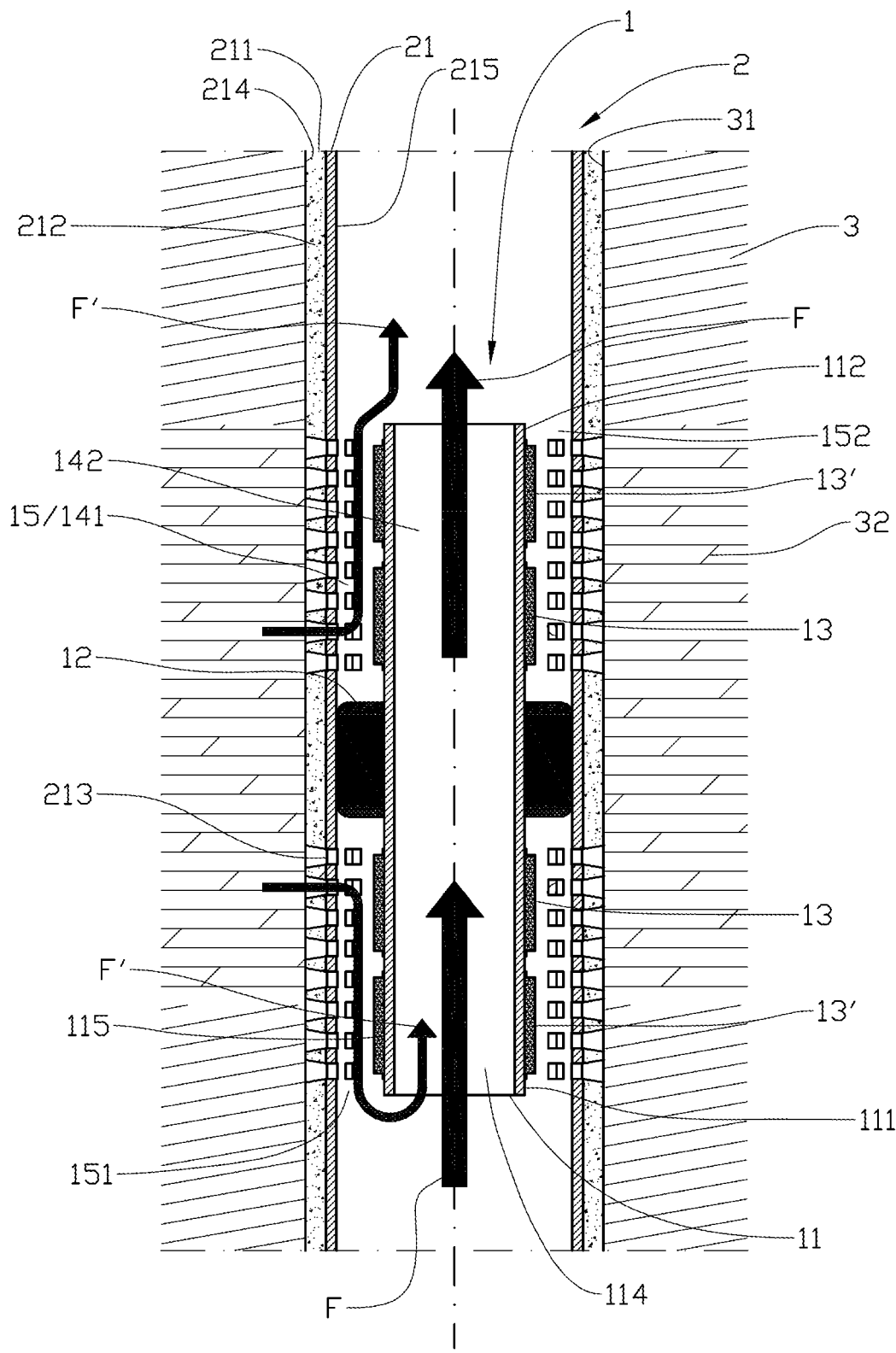
FIG. 5 shows an axial section of a section of a well in which an apparatus according to the second embodiment of the invention is placed in a casing at a production zone.

Reference is now made to FIG. 5. When the embodiment according to FIG. 2 is used, the partial fluid flow F' will partly flow towards the first end portion 111 of the tubular body 11, partly towards the second end portion 112 of the tubular body 11, as the first flow path 141 is bipartite, extending from the seal 12 to a first mouth 151 at the first end portion 111 of the tubular body 11 and from the seal 12 to a second mouth 152 at the second end portion 112 of the tubular body 11, respectively.

The length of the tubular body 11 may be considerably smaller than the axial extent of the inflow portion 213.

Even though said flow annulus 15 is open to the main fluid flow F at the second end portion 112, or the first and second end portions 111, 112, of the tubular body 11, there will be no inflow of fluid from the main fluid flow F because flow from the first end portion 111 of the tubular body 11 to the second end portion 112 of the tubular body 11 through the flow annulus 15 is prevented by the seal 12. Besides, the partial fluid flow F' out through the mouth(s) 151, 152 of the flow annulus 15 will prevent the main fluid flow F from entering the flow annulus 15 also in the exemplary embodiment according to FIG. 2, in which the mouth 151 at the first end portion 111 faces the main fluid flow F.

The apparatus 1 according to the invention may be set in other types of pipes forming the flow path for fluid in a portion of a well 2, possibly against the well wall 214 which is formed in the underground structure 3.

It should be noted that all the above-mentioned embodiments illustrate the invention, but do not limit it, and persons skilled in the art may construct many alternative embodiments without departing from the scope of the attached claims. In the claims, reference numbers in parentheses are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An inflow indicator apparatus for a well in an underground structure, in which at least one tracer depot is arranged to be in contact with a partial fluid flow flowing from a producing structure into the well, the inflow indicator apparatus comprising:
    a tubular body having a first end portion, a middle portion, and a second end portion, and
    one seal encircling a portion of the tubular body,
    wherein the at least one tracer depot is arranged externally on the tubular body anywhere between the first end portion and the second end portion of the tubular body,
    wherein the seal is configured to be settable against an encircling wall, and
    wherein the tubular body, the seal and the encircling wall define an annulus forming a first flow path for the partial fluid flow which is separated from a second fluid flow path through the inflow indicator apparatus for a main fluid flow formed of a through fluid line in the tubular body, the first flow path extending from the seal to either the first end portion or the second end portion of the tubular body.

2. The inflow indicator apparatus according to claim 1, wherein the seal encircles the first end portion of the tubular body.

3. The inflow indicator apparatus according to claim 2, wherein the first end portion is arranged upstream of the second end portion in the well.

4. The inflow indicator apparatus according to claim 2, wherein the first end portion is arranged downstream of the second end portion in the well.

5. The inflow indicator apparatus according to claim 1, wherein the seal encircles the middle portion of the tubular body.

6. The inflow indicator apparatus according to claim 1, wherein the tubular body exhibits a length that is smaller than an axial extent of an inflow portion for the producing structure in the well.

7. The inflow indicator apparatus according to claim 1, wherein the tubular body exhibits a length that is equal to an axial extent of an inflow portion for the producing structure in the well.

8. The inflow indicator apparatus according to claim 1, wherein the encircling wall is a pipe wall.

9. The inflow indicator apparatus according to claim 1, wherein the encircling wall is a well wall defining a borehole against the underground structure.

10. A method of monitoring the inflow of a partial fluid flow from a producing structure into a well in an underground structure, the method comprising:
    arranging an inflow indicator apparatus at the producing structure, the inflow indicator apparatus comprising:
        a tubular body having a first end portion and a second end portion, and
        one seal encircling a portion of the tubular body,
        wherein at least one tracer depot is arranged externally on the tubular body anywhere between the first end portion and the second end portion of the tubular body, and
        wherein the tubular body, the seal and the encircling wall define an annulus,
    forming a first flow path for the partial fluid flow in the annulus between the inflow indicator apparatus and the encircling wall from an inflow portion from the producing structure by setting the seal against the encircling wall, in order thereby to prevent the flow of a main fluid flow in the annulus,
    letting the partial fluid flow be brought into contact with the at least one tracer depot arranged externally on the tubular body,
    directing the partial fluid flow into the main fluid flow at the second end portion of the tubular body,
    directing an accumulated fluid flow out of the well, and
    registering the contents of tracers released from the at least one tracer depot into the partial fluid flow.

11. A well assembly, comprising:
    a production tubular having an external production wall, an internal production wall, and a plurality of perforations extending from the external production wall to the internal production wall; and
    an inflow apparatus located within the production tubular, the inflow apparatus comprising:
        a tubular body extending from a first end to a second end and having an external inflow wall and an internal inflow wall, the internal inflow wall defining a main flow path for a well fluid;
        a seal fully encircling the tubular body and radially extending from the external inflow wall to the internal production wall; and
        a plurality of tracer depots arranged on the external inflow wall;

wherein the internal production wall, the external inflow wall, and the seal define an annulus such that a portion of the well fluid flows into the annulus through the plurality of perforations and along a partial fluid flow path past the plurality of tracer depots in a direction parallel to the main flow path.

12. The well assembly of claim 11, wherein the first end is positioned upstream of the second end.

13. The well assembly of claim 12, wherein the seal is located between the first end and a midpoint of the tubular body.

14. The well assembly of claim 11, wherein the plurality of tracer depots comprises a first set of tracer depots positioned upstream of the seal and a second set of tracer depots positioned downstream of the seal.

15. The well assembly of claim 14, wherein the direction of the partial fluid flow path past the first set of tracer depots is opposite the main flow path.

\* \* \* \* \*